(12) United States Patent
Dai et al.

(10) Patent No.: US 10,034,243 B2
(45) Date of Patent: Jul. 24, 2018

(54) METHOD AND DEVICE FOR INTERWORKING BETWEEN ACCESS TECHNOLOGY NETWORKS

(71) Applicant: ZTE CORPORATION, Shenzhen, Guangdong Province (CN)

(72) Inventors: Qian Dai, Shenzhen (CN); Jun Yao, Shenzhen (CN); Yunpeng Cui, Shenzhen (CN); Ting Lu, Shenzhen (CN)

(73) Assignee: XI'AN ZHONGXING NEW SOFTWARE CO., LTD. (CN)

( * ) Notice: Subject to any disclaimer, the term of this patent is extended or adjusted under 35 U.S.C. 154(b) by 261 days.

(21) Appl. No.: 14/890,283

(22) PCT Filed: Mar. 26, 2014

(86) PCT No.: PCT/CN2014/074103
§ 371 (c)(1),
(2) Date: Nov. 10, 2015

(87) PCT Pub. No.: WO2014/180195
PCT Pub. Date: Nov. 13, 2014

(65) Prior Publication Data
US 2016/0119873 A1    Apr. 28, 2016

(30) Foreign Application Priority Data

May 10, 2013 (CN) .......................... 2013 1 0172767

(51) Int. Cl.
*H04W 52/02* (2009.01)
*H04W 76/15* (2018.01)
(Continued)

(52) U.S. Cl.
CPC ... *H04W 52/0222* (2013.01); *H04W 52/0229* (2013.01); *H04W 52/0235* (2013.01);
(Continued)

(58) Field of Classification Search
CPC ......... H04W 52/0229; H04W 52/0251; H04W 52/0222; H04W 52/0235; H04W 76/025;
(Continued)

(56) References Cited

U.S. PATENT DOCUMENTS

2008/0049673 A1    2/2008 Park et al.
2008/0279129 A1*  11/2008 Zhodzishsky ......... H04W 48/18
                                                                      370/311
(Continued)

FOREIGN PATENT DOCUMENTS

| CN | 101523765 A | 9/2009 |
| CN | 102547881 A | 7/2012 |
| EP | 2461631 A2  | 6/2012 |

OTHER PUBLICATIONS

Anonymous: "ARIB TR-T12-36.938 V8.0.0 Improved Network Controlled Mobility between E-UTRN and 3GPP2/Mobile WIMAX Radio Technologies (Release 8)", ARIB, Mar. 31, 2008, pp. 1-34, XP002545496.
(Continued)

*Primary Examiner* — Brian D Nguyen
(74) *Attorney, Agent, or Firm* — Plumsea Law Group, LLC (57) ABSTRACT

A method and a device for interworking between access technology networks are disclosed. The method includes: a decision-making entity for interworking between a first access technology network and a second access technology network judging whether it is required to adopt a terminal power saving priority principle, and when determining to adopt the terminal power saving priority principle, triggering an interworking process between the first access technology network and the second access technology network only when a preset triggering event occurs.

20 Claims, 4 Drawing Sheets

(51) Int. Cl.
  *H04W 84/04* (2009.01)
  *H04W 84/12* (2009.01)
  *H04W 88/06* (2009.01)
(52) U.S. Cl.
  CPC ....... *H04W 52/0251* (2013.01); *H04W 76/15* (2018.02); *H04W 84/042* (2013.01); *H04W 84/12* (2013.01); *H04W 88/06* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/24* (2018.01)
(58) Field of Classification Search
  CPC ... H04W 84/042; H04W 84/12; H04W 88/06; Y02B 60/50
  See application file for complete search history.

(56) References Cited

U.S. PATENT DOCUMENTS

| | | | |
|---|---|---|---|
| 2010/0067488 A1 | 3/2010 | Sashihara | |
| 2011/0122812 A1* | 5/2011 | Jeong | H04W 36/18 370/328 |
| 2011/0170466 A1* | 7/2011 | Kwun | H04W 52/0235 370/311 |
| 2012/0015657 A1* | 1/2012 | Comsa | H04W 36/0094 455/436 |
| 2012/0287834 A1* | 11/2012 | Fashandi | H04W 36/0055 370/311 |
| 2012/0315905 A1* | 12/2012 | Zhu | H04W 36/36 455/436 |
| 2013/0073710 A1 | 3/2013 | Lee et al. | |
| 2013/0343252 A1* | 12/2013 | Chakraborty | H04W 52/0261 370/311 |
| 2014/0162592 A1* | 6/2014 | Peitzer | H04W 52/04 455/405 |

OTHER PUBLICATIONS

European Search Report dated May 23, 2016 in European Patent Application No. EP 14795010.3.
International Search Report and Written Opinion dated Jul. 3, 2014 in PCT Application No. PCT/CN2014/074103.
Office Action dated Aug. 29, 2017 for Japanese Patent Application No. 2016-512203.
Samsung, "Load balancing between 3GPP and WLAN", 3GPP TSG-RAN2 Meeting #81bis; Chicago, IL, USA, Apr. 15-19, 2013; R2-131181.
CATT, "Impact of user preference on network selection", 3GPP TSG-RAN WG2 Meeting #81bis; Chicago, IL, USA, Apr. 15-19, 2013; R2-130967.
Intel Corporation, "Text proposal on WLAN/3GPP radio interworking solution directions", 3GPP TSG-RAN WG2 Meeting #81bis; Chicago, IL, USA, Apr. 15-19, 2013; R2-131506.
MediaTek Inc., "Reduce Battery Consumption and Improve Wlan Utilization", 3GPP TSG RAN WG2 Meeting #81bis; Chicago, IL, USA, Apr. 15-19, 2013; RS-131032.

* cited by examiner

METHOD AND DEVICE FOR INTERWORKING BETWEEN ACCESS TECHNOLOGY NETWORKS

CROSS-REFERENCE TO RELATED APPLICATION(S)

This application is the U.S. National Phase application of PCT application number PCT/CN2014/074103 having a PCT filing date of Mar. 26, 2014, which claims priority of Chinese patent application 201310172767.8 filed on May 10, 2013, the disclosures of which are hereby incorporated by reference.

TECHNICAL FIELD

The present document relates to the field of wireless communication, and particularly, to a method and device for interworking between a 3rd Generation Partnership Project (3GPP) access network and a Wireless Local Area Network (WLAN).

BACKGROUND OF RELATED ART

With the constant evaluation of the wireless communication technology and standard, the mobile packet services are developed greatly, and the data throughput capacity of a single terminal has been promoted continually. With a Long Term Evolution (LTE) system as an example, the data transmission with a downlink maximum rate of 100 Mbps can be supported within a 20M bandwidth, and in the subsequent enhanced LTE (LTE Advanced) systems, the data transmission rate will be promoted, and it can even reach 1 Gbps.

The inflatable growth of data service volume of the terminal makes the relevant network resources become gradually scarce, and especially in a situation that the new generation communication technology (such as the 3G and LTE) still cannot be widely deployed in the network, it will be followed that the user rate and traffic demand cannot be satisfied, and the user experience becomes worse. How to prevent and change the situation is a problem that must be considered by the operators, on one hand, it is required to accelerate the promotion and network deployment of the new technology; on the other hand, it is wished to perform enhancement on the related networks and technologies, to achieve the object of rapidly promoting the network performance. As is known to all, besides the wireless network technology provided in the 3rd Generation Partnership Project (3GPP), the Wireless Local Area Network (WLAN) that has been universally applied at present, especially the wireless local area network based on the Institute of Electrical and Electronics Engineers (IEEE) 802.11 standard, has been widely applied to the hotspot access coverage in the family, enterprise and even internet. Wherein the technical specifications proposed by the wireless fidelity WiFi alliance (Wi-Fi Alliance) is most widely applied, thus a WiFi network is frequently equal to the WLAN network based on the IEEE 802.11 standard in practice, and in the condition of not causing a confusion, a WiFi module is also adopted to describe a wireless transceiving and processing module supporting the WLAN in the network nodes below.

In this premise, certain operators and companies have proposed to converge the WLAN with the related 3GPP network to implement the joint transmission, to achieve the object of the load distribution and network performance improvement. Even though the 3GPP has made the related protocols for Interworking between the 3GPP network and the WLAN network at present, a plurality of shortcomings still exist in the current Interworking architecture, for example, the handover of data streams is comparatively slow when a terminal User Equipment (UE) moves between the 3GPP network and the WLAN network, moreover, the data streams of the two networks are all required to go through the network elements of the 3GPP core network under this case, which causes the heavier load. In addition, another very important point is that the current architecture is still dependent on that the operator can have an independent 3GPP network and an independent and complete WLAN network, and this requires that the operator should simultaneously operate and maintain a plurality of networks, so that the operation Capital Expenditure (CAPEX) is higher. Therefore, the convergence demand of the WLAN and the 3GPP network is proposed again, and a new solution has also been gradually proposed and discussed.

The 3GPP SA2 passes the Access Network Discovery Support Functions (ANDSF) scheme, which provides a mode of selecting a target access network for the terminal according to the operator's policy.

The ANDSF standard is defined in the 3GPP R10, and the ANDSF serves as an access anchor point to implement the intelligent network selection, and through the interactive collaboration between the network and the terminal, implements the effective distribution of the network access, which conforms to the operating direction of the cooperative networking in the future. The ANDSF makes policies based on information including the network load, terminal capability and user subscription condition and so on, and helps the terminal user select the optimal network type for accessing, which implements the collaborative operation of a plurality of access ways. The ANDSF can be separately deployed, and it also can be jointly set with other network elements. At present, the industry mainstream viewpoint considers the scheme that the ANDSF can be deployed on the PCC device.

The ANDSF is a WLAN interworking scheme based on the core network, and it does not consider the influence on the access network, moreover, since the ANDSF is a relatively static scheme, it cannot adapt well to the situation of the dynamic changes of the network load and channel quality, thus the WLAN interworking discussion is also carried out in the 3GPP access network group.

Three basic candidate WLAN interworking schemes of the access network side are passed in latest 3GPP RAN2 conference (RAN2#81bis).

In scheme 1, the 3GPP access network side provides auxiliary information, and the terminal decides how to migrate services to the WLAN or the 3GPP access network according to the auxiliary information and rules provided by network elements (such as the ANDSF) except the access network. In the scheme, a decision-making entity for interworking between the 3GPP access network and the WLAN is located at the UE.

In scheme 2, the 3GPP access network side provides access network selection parameters (such as a threshold, a priority and a rule and so on) for the terminal, and the terminal decides how to migrate services to the WLAN or the 3GPP access network based on these parameters. In the scheme, a decision-making entity for interworking between the 3GPP access network and the WLAN is divided into: a rule making entity for interworking between the 3GPP access network and the WLAN and a process triggering entity for interworking between the 3GPP access network and the WLAN. Wherein, the rule making entity for interworking between the 3GPP access network and the WLAN is located at the 3GPP access network side, and the process triggering entity for interworking between the 3GPP access network and the WLAN is located at the UE side. The 3GPP access network side is responsible for making rules for interworking between the 3GPP access network and the WLAN, and the UE decides when an interworking process between the 3GPP access network and the WLAN is triggered according to the rules of the 3GPP access network side, and then in combination with its own practical WLAN measurement results and the rules of the 3GPP access network side, decides a target access network (the 3GPP network or the WLAN) and services required to be migrated.

In scheme 3, with regard to a terminal in a radio resource control RRC connection state (a long term evolution LTE system) or a CELL_DCH state (a universal mobile telecommunications system (UMTS)), the 3GPP access network side decides how the terminal to migrate services to the WLAN or the 3GPP access network, and informs the terminal. With regard to a terminal in an RRC IDLE state (the LTE system) or a CELL_PCH state or URA_PCH state (the UMTS system), the way of the scheme 2 is adopted. In the scheme, a decision-making entity for interworking between the 3GPP access network and the WLAN is located at the 3GPP access network side, and the UE side has a process triggering entity for interworking between the 3GPP access network and the WLAN (only enabled when the UE is in the RRC IDLE state (the LTE system) or the CELL_PCH state or URA_PCH state (the UMTS system).

In the above schemes, only the basic flow of the WLAN interworking is defined, but the power consumption problem of the terminal caused by the WLAN searching and interworking is not discussed. Considering that the terminal is required to execute the scanning measurement of a WLAN AP when selecting a WLAN network, and it is required to open a WLAN channel when deciding to migrate the services to the WLAN, the power consumption of the behavior is very high, and the 3GPP network side defaults to consider a user experience priority principle at present when making the discovery or search (WLAN discovery) and offload rules, and the terminal power saving is normally not taken as a preferentially considered index.

For example, a WLAN offload rule frequently used by the operators is that: when the terminal enters the coverage scope of the WLAN, the network side triggers an interworking process between the 3GPP access network and the WLAN, and requires the UE to measure and scan the WLAN, to search the WLAN and decide whether services can be migrated to improve the throughput of the UE and reduce the load of the 3GPP network, and the rule can guarantee that the UE discovers the WLAN in the first time and transfers all or part of services to the WLAN as soon as possible, to improve the user experience and reduce the load of the 3GPP network. But the rule is extremely disadvantageous to the power saving of the UE, in many cases, since the UE entering the coverage scope of the WLAN does not represent that the UE has services required to be transmitted currently or services required to be migrated, and in the case that the UE has executed the WLAN searching and even established a connection with the WLAN, but it has no services required to be migrated, the behavior of the previous WLAN searching is wasted, which additionally increases the power consumption of the UE. Especially in the case that WLAN access points are continually increased in the future, the above rule will aggravate the power consumption of the UE.

A scheme has been passed in the 3GPP RAN2, when the UE has a power-saving tendency, a Power Preference Indication (PPI) of the UE can be triggered, and the PPI is sent to an access network node of a service network, and the access network node can adjust configuration parameters of the Discontinuous Reception (DRX) mechanism of the UE according to this. But with regard to other mechanisms, there is no power-saving processing at all.

SUMMARY

The embodiments of the present document provide a method and device for interworking between access technology networks, which solves the power consumption control problem of the UE during interworking between a 3rd Generation Partnership Project (3GPP) access network and a Wireless Local Area Network (WLAN).

A method for interworking between a 3rd Generation Partnership Project (3GPP) access network and a Wireless Local Area Network (WLAN) comprises:

a decision-making entity for interworking between a first access technology network and a second access technology network judging whether to adopt a terminal power saving priority principle; and triggering an interworking process between the first access technology network and the second access technology network only when any one or any number of the following events occur:

quality of service (QoS) of a service currently running on a user equipment (UE) cannot be satisfied;

a load of a first access technology network which the UE currently accesses exceeds a first preset threshold;

a load of a second access technology network which the UE currently accesses exceeds a second preset threshold;

the first access technology network which the UE currently accesses or the second access technology network which the UE currently accesses overloads;

wireless communication link quality of the first access technology network which the UE currently accesses is lower than a third preset threshold;

wireless communication link quality of the second access technology network which the UE currently accesses is lower than a fourth preset threshold; and the UE losses a connection with the first access technology network which the UE currently accesses or the second access technology network which the UE currently accesses.

Alternatively, the first access technology network is a 3GPP access network, and the second access technology network is a WLAN.

Alternatively, that quality of service (QoS) of a service currently running on the UE can not be satisfied comprises:

a length of a time during which the QoS of the service currently running on the UE can not be satisfied continuously exceeding a first preset time.

Alternatively, a load of a first access technology network which the UE currently accesses exceeding a first preset threshold comprises:

a length of a time during which the load of the first access technology network which the UE currently accesses continuously exceeds the first preset threshold reaching a second preset time.

Alternatively, a load of a second access technology network which the UE currently accesses exceeding a second preset threshold comprises:

a length of a time during which the load of the second access technology network which the UE currently accesses continuously exceeds the second preset threshold reaching a third preset time.

Alternatively, wireless communication link quality of the first access technology network which the UE currently accesses being lower than a third preset threshold comprises:

a length of a time during which the wireless communication link quality of the first access technology network which the UE currently accesses is continuously lower than the third preset threshold reaching a fourth preset time.

Alternatively, wireless communication link quality of the second access technology network which the UE currently accesses being lower than a fourth preset threshold comprises:

a length of a time during which the wireless communication link quality of the second access technology network which the UE currently accesses is continuously lower than the fourth preset threshold reaching a fifth preset time.

Alternatively, a decision-making entity for interworking between a first access technology network and a second access technology network judging whether to adopt a terminal power saving priority principle comprises:

when the UE triggers a power preference indication (PPI) and the PPI is inclined to power saving, the decision-making entity for interworking between the first access technology network and the second access technology network acquiring the PPI; and the decision-making entity for interworking between the first access technology network and the second access technology network determining that it is required to adopt the terminal power saving priority principle according to the PPI.

Alternatively, the decision-making entity for interworking between the first access technology network and the second access technology network acquiring the PPI comprises:

when the decision-making entity for interworking between the first access technology network and the second access technology network is located in a first access technology network node, the UE sending the PPI to the decision-making entity for interworking between the first access technology network and the second access technology network in the first access technology network node.

Alternatively, the decision-making entity for interworking between the first access technology network and the second access technology network acquiring the PPI comprises:

when the decision-making entity for interworking between the first access technology network and the second access technology network is located in the UE, the UE voluntarily sending the PPI to the decision-making entity for interworking between the first access technology network and the second access technology network in the UE.

Alternatively, a decision-making entity for interworking between a first access technology network and a second access technology network judging whether to adopt a terminal power saving priority principle comprises:

when the UE has a power saving priority attribute, the decision-making entity for interworking between the first access technology network and the second access technology network acquiring the power saving priority attribute of the UE; and the decision-making entity for interworking between the first access technology network and the second access technology network determining that it is required to adopt the terminal power saving priority principle according to the power saving priority attribute of the UE.

Alternatively, the decision-making entity for interworking between the first access technology network and the second access technology network acquiring the power saving priority attribute of the UE comprises:

when the decision-making entity for interworking between the first access technology network and the second access technology network is located in the first access technology network node, the UE sending the power saving priority attribute to the decision-making entity for interworking between the first access technology network and the second access technology network in the first access technology network node.

Alternatively, the power saving priority attribute is contained in registration information of the UE or a context of the UE, and the decision-making entity for interworking between the first access technology network and the second access technology network acquires the power saving priority attribute through a connection process between the UE and the first access technology network.

Alternatively, the decision-making entity for interworking between the first access technology network and the second access technology network acquiring the power saving priority attribute of the UE comprises:

when the decision-making entity for interworking between the first access technology network and the second access technology network is located in the UE, the UE voluntarily sending the power saving priority attribute to the decision-making entity for interworking between the first access technology network and the second access technology network in the UE.

Alternatively, the above method for interworking between access technology networks further comprises:

a rule making entity for interworking between a first access technology network and a second access technology network or the decision-making entity for interworking between the first access technology network and the second access technology network configuring parameters in the interworking process, wherein the parameters comprise: the first preset time, the second preset time, the third preset time, the fourth preset time, the fifth preset time, the first preset threshold, the second preset threshold, the third preset threshold and the fourth preset threshold.

Alternatively, the above method for interworking between access technology networks further comprises:

when the rule making entity for interworking between the first access technology network and the second access technology network or the decision-making entity for interworking between the first access technology network and the second access technology network is located in the first access technology network, the first access technology network sending the parameters to the UE.

The embodiment of the present document further provides a device for interworking between access technology networks, which comprises:

a judgment module, configured to: judge whether to adopt a terminal power saving priority principle;

a triggering module, configured to: trigger an interworking process between a first access technology network and a second access technology network only when any one or any number of the following events occur:

quality of service (QoS) of a service currently running on a user equipment (UE) cannot be satisfied;

a load of a first access technology network which the UE currently accesses exceeds a first preset threshold;

a load of a second access technology network which the UE currently accesses exceeds a second preset threshold;

the first access technology network which the UE currently accesses or the second access technology network which the UE currently accesses overloads;

wireless communication link quality of the first access technology network which the UE currently accesses is lower than a third preset threshold;

wireless communication link quality of the second access technology network which the UE currently accesses is lower than a fourth preset threshold; and the UE losses a connection with the first access technology network which the UE currently accesses or the second access technology network which the UE currently accesses.

Alternatively, the first access technology network is a 3rd Generation Partnership Project (3GPP) access network, and the second access technology network is a Wireless Local Area Network (WLAN).

Alternatively, the judgment module comprises:

a first information acquisition unit, configured to: when the UE triggers a power preference indication (PPI) and the PPI is inclined to power saving, acquire the PPI; and a first judgment unit, configured to: determine that it is required to adopt the terminal power saving priority principle according to the PPI.

Alternatively, the judgment module further comprises:

a second information acquisition unit, configured to: when the UE has a power saving priority attribute, acquire the power saving priority attribute of the UE; and a second judgment unit, configured to: determine that it is required to adopt the terminal power saving priority principle according to the power saving priority attribute of the UE.

Alternatively, the device further comprises:

a configuration module, configured to: configure parameters in the interworking process, wherein the parameters comprise: a first preset time, a second preset time, a third preset time, a fourth preset time, a fifth preset time, a first preset threshold, a second preset threshold, a third preset threshold and a fourth preset threshold.

Alternatively, the device further comprises:

a configuration information sending module, configured to: send the parameters in the interworking process to the UE.

The embodiments of the present document provide a method and device for interworking between access technology networks, a decision-making entity for interworking between a first access technology network and a second access technology network judges whether it is required to adopt a terminal power saving priority principle, and when determining to adopt the terminal power saving priority principle, triggers an interworking process between the first access technology network and the second access technology network only when a preset triggering event occurs. It can be used for controlling the power consumption of the UE in the interworking process between the 3GPP access network and the WLAN, which solves the power consumption control problem of the UE during the interworking between the 3GPP access network and the WLAN.

PREFERRED EMBODIMENTS OF THE INVENTION

Considering that the terminal is required to execute the scanning measurement of a WLAN AP when selecting a WLAN network, and it is required to open a WLAN channel when deciding to migrate the services to the WLAN, the power consumption of the behavior is very high, and the 3GPP network side defaults to consider a user experience priority principle at present when making the WLAN discovery and offload rules, and the terminal power saving is normally not taken as a preferentially considered index.

For example, a WLAN offload rule frequently used by the operators is that: when the terminal enters the coverage scope of the WLAN, the network side triggers an interworking process between the 3GPP access network and the WLAN, and requires the UE to measure and scan the WLAN, to search the WLAN and decide whether services can be migrated to improve the throughput of the UE and reduce the load of the 3GPP network, and the rule can guarantee that the UE discovers the WLAN in the first time and transfers all or part of services to the WLAN as soon as possible, to improve the user experience and reduce the load of the 3GPP network. But the rule is extremely disadvantageous to the power saving of the UE, in many cases, since the UE entering the coverage scope of the WLAN does not represent that the UE has services required to be transmitted currently or services required to be migrated, and in the case that the UE has executed the WLAN searching and even established a connection with the WLAN, but it has no services required to be migrated, the behavior of the previous WLAN searching is wasted, which additionally increases the power consumption of the UE. Especially in the case that WLAN access points are continually increased in the future, the above rule will aggravate the power consumption of the UE.

A scheme has been passed in the 3GPP RAN2, when the UE has a power-saving tendency, a Power Preference Indication (PPI) of the UE can be triggered, and the PPI is sent to an access network node of a service network, and the access network node can adjust configuration parameters of the Discontinuous Reception (DRX) mechanism of the UE according to the PPI. But with regard to other mechanisms, there is no power-saving processing at all.

The embodiment of the present document provides a method for adaptive interworking between access technology networks based on the power-saving demand of the UE, so that the optimal balance between the user experience and the terminal power saving can be obtained during the interworking between the 3GPP access network and the WLAN of the UE.

The embodiments of the present document will be described in detail in combination with the accompanying drawings below. It should be noted that the embodiments in the present document and the characteristics in the embodiments can be optionally combined with each other in the condition of no conflict.

An LTE system is taken as an example to make descriptions in the embodiments of the present document, and with regard to a UMTS system, the implementation principle of the technical scheme provided in the embodiments of the present document is the same.

In the embodiments of the present document, the UE is simultaneously located in coverage scopes of the LTE and the WLAN, and both the UE and an LTE base station support an LTE and WLAN interworking function.

When the UE triggers a PPI requiring for power saving due to certain conditions, for example, the battery level of the UE is lower than a certain level, for example, it is lower than 30%;

as a software or service with higher power consumption is running on the UE for a long time, and a descent speed of the battery level continually exceeds a certain level;

the UE enters an area without power source supplement, and the user initiatively selects a power-saving mode; and the UE sends the triggered PPI to the LTE base station.

Or the UE itself belongs to a type of power saving priority, such as a portable medical monitor and a person/asset tracking device, and this type of devices are required to work for a long time and belong to the type of power saving priority. The power saving attribute can be taken as a content of registration information of the UE or a content of a context of the UE, and it is sent to the LTE base station when a connection is established between the UE and the LTE network.

According to the difference of locations where a decision-making entity for interworking between the 3GPP access network and the WLAN is located, the three flow schemes for interworking between the 3GPP access network and the WLAN mentioned in the background of the related art are respectively taken as a hypothesis premise to describe the embodiments below.

Firstly the embodiment 1 of the present document will be described in combination with the accompanying drawing.

In the embodiment of the present document, the scheme 1 in the background of the related art is taken as an application scenario, that is, the 3GPP access network is taken as a first access technology network, and the WLAN is taken as a second access technology network. A 3GPP access network side provides auxiliary information, and a terminal decides how to migrate services to the WLAN or the 3GPP access network according to the auxiliary information and rules provided by network elements (such as the ANDSF) except the access network.

Figure 1:
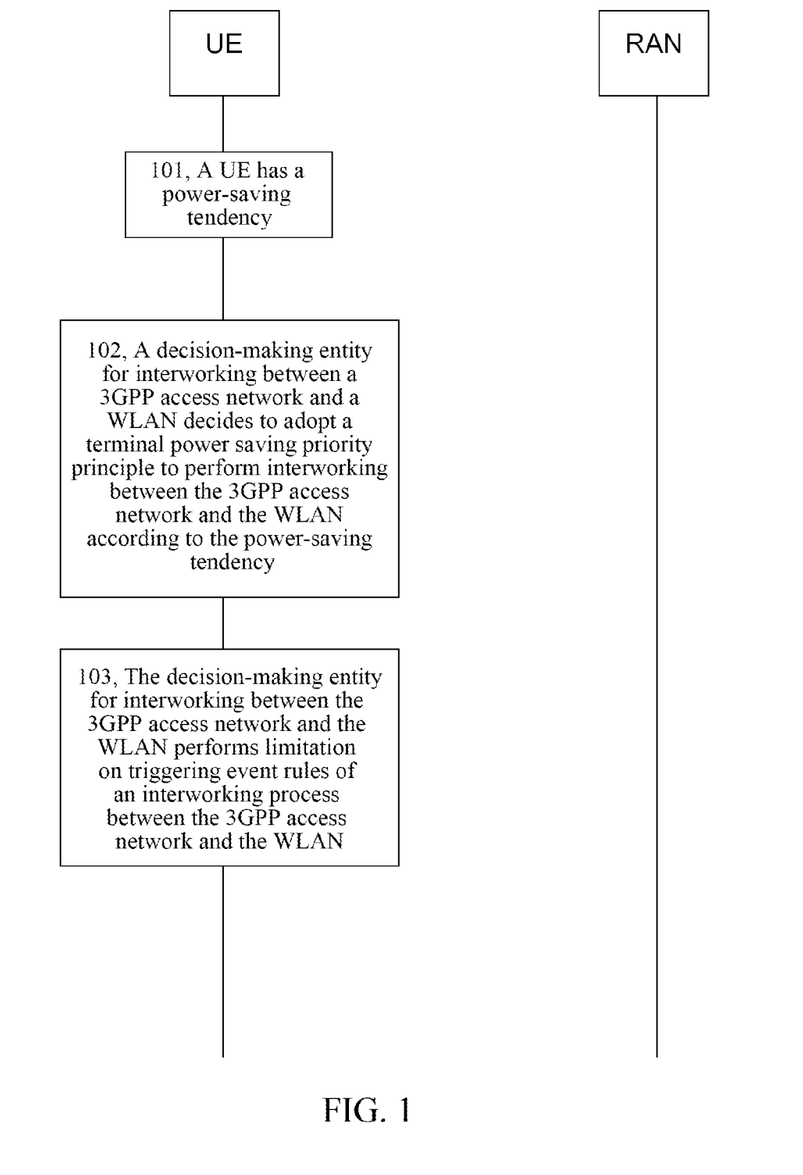
FIG. 1 is a flow chart of a method for interworking between access technology networks provided in the embodiment 1 of the present document.

In the application scenario, the decision-making entity for interworking between the 3GPP access network and the WLAN is located at the UE, the flow of interworking between the 3GPP access network and the WLAN in the embodiment of the present document is as shown in FIG. 1, and the following steps are included.

In step 101, when the UE has a power-saving tendency, as mentioned before, for example, the UE triggers the PPI requiring for power saving (or the UE has a power saving priority attribute), the decision-making entity for interworking between the 3GPP access network and the WLAN directly acquires the information.

In step 102, the decision-making entity for interworking between the 3GPP access network and the WLAN decides to adopt a terminal power saving priority principle to perform interworking between the 3GPP access network and the WLAN according to the power-saving tendency.

In step 103, the decision-making entity for interworking between the 3GPP access network and the WLAN performs limitation on triggering event rules of the interworking process between the 3GPP access network and the WLAN, and the limitation way is as follows:

only when the following events occur, it is to allow triggering the interworking process between the 3GPP access network and the WLAN:

QoS of a service currently running on the UE cannot be satisfied, or it cannot be satisfied for a period of a first preset time;

or a load of the 3GPP access network which the UE currently accesses exceeds a first preset threshold or exceeds the first preset threshold for a period of a second preset time, or a load of the WLAN which the UE currently accesses exceeds a second preset threshold or exceeds the second preset threshold for a period of a third preset time, or the 3GPP access network which the UE currently accesses or the WLAN which the UE currently accesses overloads;

or wireless communication link quality of the 3GPP access network which the UE currently accesses is lower than a third preset threshold or is lower than the third preset threshold for a period of a fourth preset time;

or wireless communication link quality of the WLAN which the UE currently accesses is lower than a fourth preset threshold or is lower than the fourth preset threshold for a period of a fifth preset time;

or the UE losses a connection with the 3GPP access network which the UE currently accesses or the WLAN which the UE currently accesses.

Wherein, all the above preset time and preset thresholds can be configured by the UE itself.

Or, the third preset threshold also can continue to use a threshold corresponding to an intra-system measurement event A2 of the LTE system.

The embodiment 2 of the present document will be described in combination with the accompanying drawing below.

In the embodiment of the present document, the scheme 2 in the background of the related art is taken as an application scenario, that is, the 3GPP access network is taken as a first access technology network, and the WLAN is taken as a second access technology network. A 3GPP access network side provides access network selection parameters (such as a threshold, a priority and a rule and so on) for a terminal, and the terminal decides how to migrate services to the WLAN or the 3GPP access network based on these parameters.

In the embodiment of the present document, the decision-making entity for interworking between the 3GPP access network and the WLAN is divided into: a rule making entity for interworking between the 3GPP access network and the WLAN and a process triggering entity for interworking between the 3GPP access network and the WLAN. Wherein, the rule making entity for interworking between the 3GPP access network and the WLAN is located at the 3GPP access network side, and the process triggering entity for interworking between the 3GPP access network and the WLAN is located at the UE side.

The 3GPP access network side is responsible for making rules for interworking between the 3GPP access network and the WLAN, and the UE decides when an interworking process between the 3GPP access network and the WLAN is triggered according to the rules of the 3GPP access network side, and then in combination with its own practical WLAN measurement results and the rules of the 3GPP access network side, decides a target access network (the 3GPP network or the WLAN) and services required to be migrated.

Figure 2:
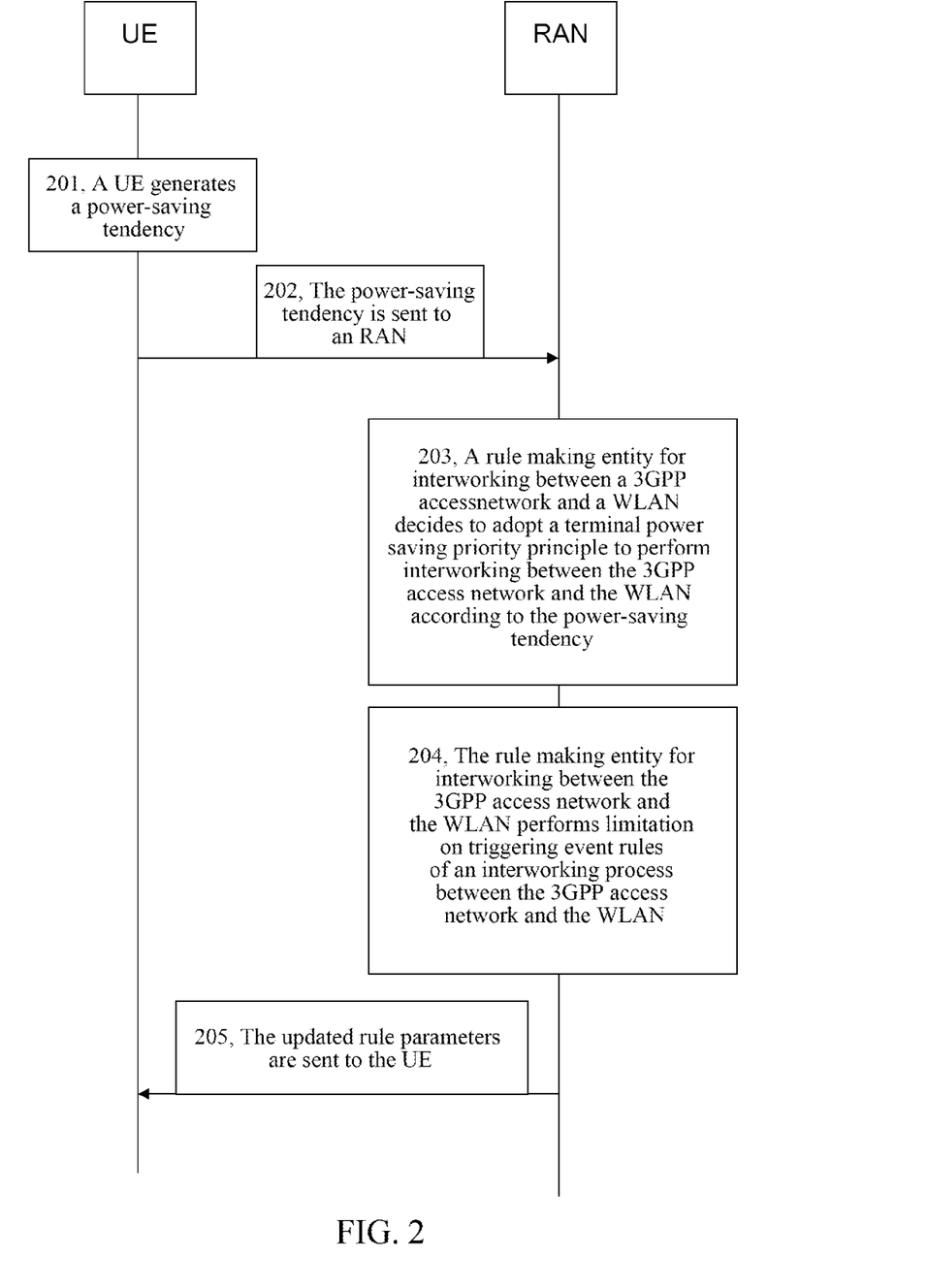
FIG. 2 is a flow chart of a method for interworking between access technology networks provided in the embodiment 2 of the present document.

The flow of interworking between the 3GPP access network and the WLAN in the embodiment of the present document is as shown in FIG. 2, and the following steps are included.

In step 201, the UE generates a power-saving tendency, as mentioned before, for example, the UE triggers the PPI requiring for power saving (or the UE has a power saving priority attribute);

In step 202, the UE sends the power-saving tendency information to an RAN side, and the rule making entity for interworking between the 3GPP access network and the WLAN acquires the information;

In step 203, the rule making entity for interworking between the 3GPP access network and the WLAN decides to adopt a terminal power saving priority principle to perform interworking between the 3GPP access network and the WLAN according to the power-saving tendency;

In step 204, the rule making entity for interworking between the 3GPP access network and the WLAN performs limitation on triggering event rules of the interworking process between the 3GPP access network and the WLAN, and the limitation way is similar to the previous embodiment;

In step 205, the RAN sends new rule parameters for interworking between the 3GPP access network and the WLAN which has been limited to the UE, and the process triggering entity for interworking between the 3GPP access network and the WLAN located at the UE acquires the new parameters.

The configuration and sending of the new parameters includes that:

the first preset time, the second preset time, the third preset time, the fourth preset time and the fifth preset time are configured by the 3GPP access network side and sent to the UE, or they are appointed in advance through the standard, and a timer is set at the UE side to time with regard to the first preset time, the second preset time, the third preset time, the fourth preset time and the fifth preset time.

The first preset threshold is configured by the 3GPP access network side and sent to the UE, or it is appointed in advance through the standard, and the 3GPP access network notifies the UE of the load condition of the 3GPP access network itself, and the notification method can be broadcasting, paging and dedicated signaling.

Or, the first preset threshold and the second preset time are configured by the 3GPP access network side but not sent to the UE, and when a load of the 3GPP access network exceeds the first preset threshold or exceeds the first preset threshold for a period of the second preset time, the 3GPP access network notifies the UE of an occurrence of the situation, and the notification method can be broadcasting, paging and dedicated signaling;

the second preset threshold is configured by the 3GPP access network side and sent to the UE, or it is appointed in advance through the standard.

The third preset threshold is configured by the 3GPP access network side and sent to the UE, or it is appointed in advance through the standard, or it is a threshold corresponding to an intra-system measurement event A2 (when the LTE system is used), or it is a threshold corresponding to a measurement event 1F or 2D (when the UMTS system is used).

The fourth preset threshold is configured by the 3GPP access network side and sent to the UE, or it is appointed in advance through the standard.

The embodiment 3 of the present document will be described in combination with the accompanying drawing below.

In the embodiment of the present document, the scheme 3 in the background of the related art is taken as an application scenario, that is, the 3GPP access network is taken as a first access technology network, and the WLAN is taken as a second access technology network. With regard to a terminal in an RRC connection state (the LTE system) or a CELL_DCH state (the UMTS system), the 3GPP access network side decides how the terminal to migrate services to the WLAN or the 3GPP access network, and informs the terminal. With regard to a terminal in an RRC IDLE state (the LTE system) or a CELL_PCH state or URA_PCH state (the UMTS system), the way of the scheme 2 in the background of the related art (namely the application scenario in the embodiment 2 of the present document) is adopted. In the scheme, a decision-making entity for interworking between the 3GPP access network and the WLAN is located at the 3GPP access network side, and the UE side has a process triggering entity for interworking between the 3GPP access network and the WLAN (only enabled when the UE is in the RRC IDLE state (the LTE system) or the CELL_PCH state or URA_PCH state (the UMTS system).

Figure 3:
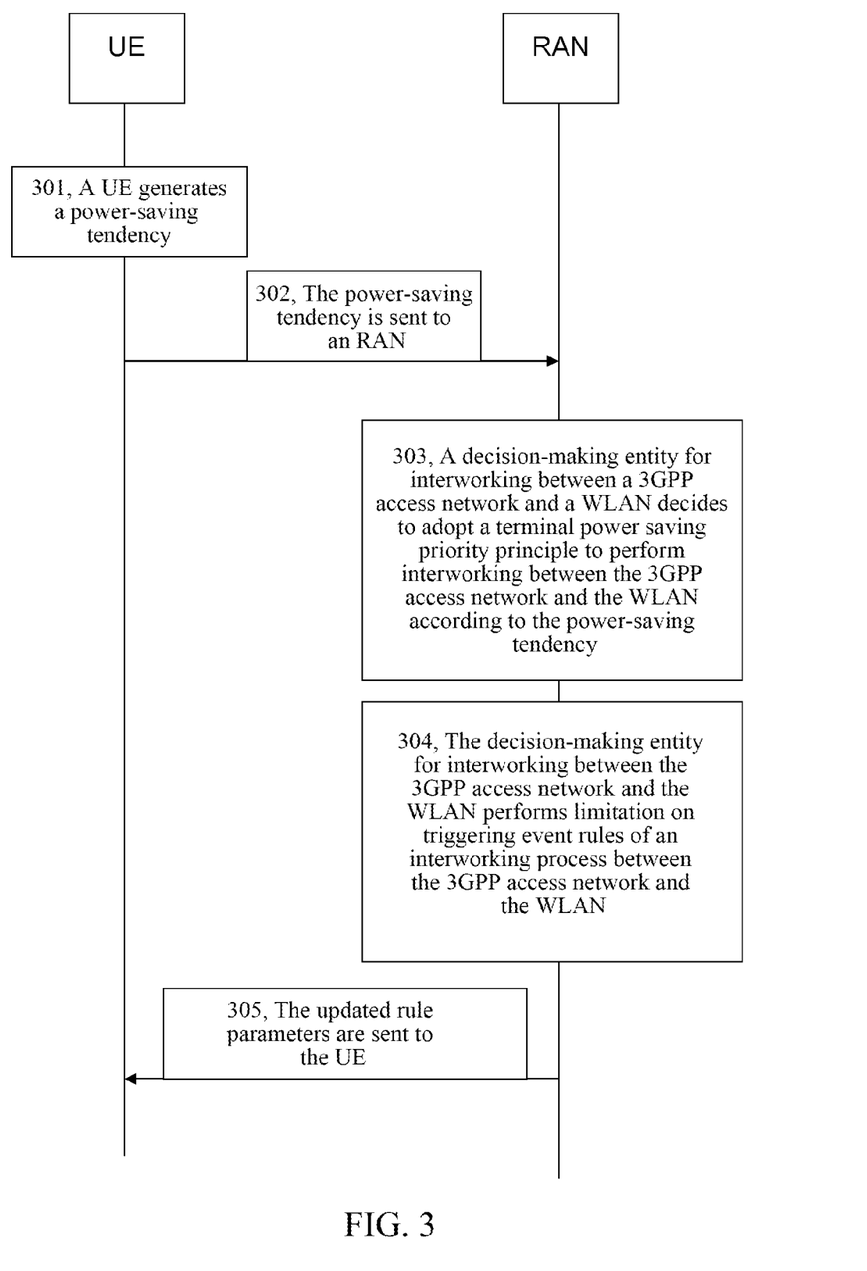
FIG. 3 is a flow chart of a method for interworking between access technology networks provided in the embodiment 3 of the present document.

The flow of interworking between the 3GPP access network and the WLAN in the embodiment of the present document is as shown in FIG. 3, and the following steps are included.

In step 301, the UE generates a power-saving tendency, as mentioned before, for example, the UE triggers the PPI requiring for power saving (or the UE has a power saving priority attribute);

In step 302, the UE sends the power-saving tendency information to an RAN side, and the decision-making entity for interworking between the 3GPP access network and the WLAN acquires the information;

In step 303, the decision-making entity for interworking between the 3GPP access network and the WLAN decides to adopt a terminal power saving priority principle to perform interworking between the 3GPP access network and the WLAN according to the power-saving tendency;

In step 304, the decision-making entity for interworking between the 3GPP access network and the WLAN performs limitation on triggering event rules of the interworking process between the 3GPP access network and the WLAN, and the limitation way is similar to the previous embodiment.

In step 305, if the UE keeps in a connection state with the 3GPP RAN at this point (with regard to the LTE system, the UE is in the RRC connection state; and with regard to the UMTS system, the UE is in the CELL_DCH state or CELL_FACH state), the RAN sends new rule parameters for interworking between the 3GPP access network and the WLAN which has been limited to the UE; and when the UE enters the RRC IDLE state (the LTE system) or the CELL_PCH state or URA_PCH state (the UMTS system), the process triggering entity for interworking between the 3GPP access network and the WLAN located at the UE can perform interworking between the 3GPP access network and the WLAN according to the new parameters.

The configuration and sending of the new parameters includes that:

the first preset time is configured by the 3GPP access network side and sent to the UE, or it is appointed in advance through the standard.

The first preset threshold and the second preset time are configured by the 3GPP access network side, or they are appointed in advance through the standard;

the second preset threshold and the third preset time are configured by the 3GPP access network side and sent to the UE, or they are appointed in advance through the standard.

The third preset threshold and the fourth preset time are configured by the 3GPP access network side and sent to the UE, or they are appointed in advance through the standard, or they are thresholds corresponding to an intra-system measurement event A2 (when the LTE system is used), or they are thresholds corresponding to a measurement event 1F or 2D (when the UMTS system is used).

The fourth preset threshold and the fifth preset time are configured by the 3GPP access network side and sent to the UE, or they are appointed in advance through the standard.

The embodiment 4 of the present document will be described in combination with the accompanying drawing below.

Figure 4:
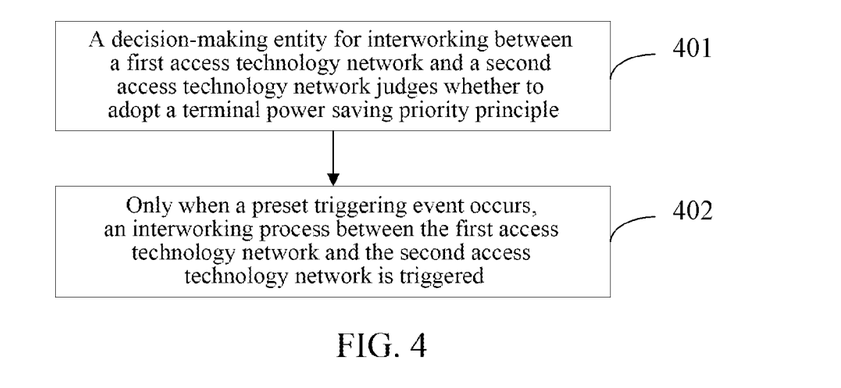
FIG. 4 is a flow chart of a method for interworking between access technology networks provided in the embodiment 4 of the present document.

The embodiment of the present document provides a method for interworking between the 3GPP access network and the WLAN, and the 3GPP access network is taken as a first access technology network, and the WLAN is taken as a second access technology network. The flow of completing the interworking between the 3GPP access network and the WLAN with the method is as shown in FIG. 4, and the following steps are included.

In step 401, a decision-making entity for interworking between the first access technology network and the second access technology network judges whether to adopt a terminal power saving priority principle.

In the step, it can determine to adopt the terminal power saving priority principle through information of a PPI or a power saving priority attribute.

The scheme of using the PPI as a judgment basis is described as follows.

1. When the UE triggers a PPI and the PPI is inclined to power saving, a decision-making entity for interworking between the 3GPP access network and the WLAN acquires the PPI; and when the decision-making entity for interworking between the 3GPP access network and the WLAN is located in the 3GPP access network node, the UE sends the PPI to the decision-making entity for interworking between the 3GPP access network and the WLAN in the 3GPP access network node.

When the decision-making entity for interworking between the 3GPP access network and the WLAN is located in the UE, the UE voluntarily sends the PPI to the decision-making entity for interworking between the 3GPP access network and the WLAN in the UE.

2. The decision-making entity for interworking between the 3GPP access network and the WLAN determines that it is required to adopt the terminal power saving priority principle according to the PPI.

The scheme of using the power saving priority attribute as a judgment basis is described as follows.

1. When the UE has a power saving priority attribute (for example, it belongs to a terminal type of power saving priority), the decision-making entity for interworking between the 3GPP access network and the WLAN acquires the power saving priority attribute of the UE; and when the decision-making entity for interworking between the 3GPP access network and the WLAN is located in the 3GPP access network node, the UE sends the power saving priority attribute to the decision-making entity for interworking between the 3GPP access network and the WLAN in the 3GPP access network node. The power saving priority attribute is contained in registration information of the UE or a context of the UE, and the decision-making entity for interworking between the 3GPP access network and the WLAN acquires the power saving priority attribute through a connection process between the UE and the 3GPP access network.

When the decision-making entity for interworking between the 3GPP access network and the WLAN is located in the UE, the UE voluntarily sends the power saving priority attribute to the decision-making entity for interworking between the 3GPP access network and the WLAN in the UE.

2. The decision-making entity for interworking between the 3GPP access network and the WLAN determines that it is required to adopt the terminal power saving priority principle according to the power saving priority attribute of the UE.

In step 402, only when a preset triggering event occurs, an interworking process between the first access technology network and the second access technology network is triggered.

In the step, in order to perform control on the power consumption of the UE, only when any one or any number of the following events occur, the interworking process between the 3GPP access network and the WLAN is triggered:

QoS of a service currently running on the UE cannot be satisfied (that is, a length of a time during which the QoS of the service currently running on the UE can noy be satisfied continuously exceeds a first preset time, and the first preset time can be extremely short to implement prompt triggering, and it also can be a long period of time), a load of the 3GPP access network which the UE currently accesses exceeds a first preset threshold (that is, a length of a time during which the load of the 3GPP access network which the UE currently accesses continuously exceeds the first preset threshold reaches a second preset time, and the second preset time can be extremely short to implement prompt triggering, and it also can be a long period of time), a load of the WLAN which the UE currently accesses exceeds a second preset threshold (that is, a length of a time during which the load of the WLAN which the UE currently accesses continuously exceeds the second preset threshold reaches a third preset time, and the third preset time can be extremely short to implement prompt triggering, and it also can be a long period of time), the 3GPP access network which the UE currently accesses or the WLAN which the UE currently accesses has an overload, wireless communication link quality of the 3GPP access network which the UE currently accesses is lower than a third preset threshold (that is, a length of a time during which the wireless communication link quality of the 3GPP access network which the UE currently accesses is continuously lower than the third preset threshold reaches a fourth preset time, and the fourth preset time can be extremely short to implement prompt triggering, and it also can be a long period of time), wireless communication link quality of the WLAN which the UE currently accesses is lower than a fourth preset threshold (that is, a length of a time during which the wireless communication link quality of the WLAN which the UE currently accesses is continuously lower than the fourth preset threshold reaches a fifth preset time, and the fifth preset time can be extremely short to implement prompt triggering, and it also can be a long period of time), or, the UE losses a connection with the 3GPP access network which the UE currently accesses or the WLAN which the UE currently accesses.

The configuration of the various preset time and preset thresholds related in the embodiments of the present document will be described below.

1. Corresponding to the scheme 1 in the background of the related art, the configuration scheme is described as follows:

the first preset time, the second preset time, the third preset time, the fourth preset time and the fifth preset time are configured by the UE itself, or they are configured by the access network discovery and selection function unit (ANDSF), or they are appointed in advance through the standard, and a timer is set at the UE side to perform timing on the first preset time, the second preset time, the third preset time, the fourth preset time and the fifth preset time respectively;

the first preset threshold is configured by the UE itself, or it is appointed in advance through the standard, or it is configured by the ANDSF, and the 3GPP access network notifies the UE of the load condition of the 3GPP access network itself by means of broadcasting or paging or dedicated signaling, and the notification method can be broadcasting, paging and dedicated signaling;

the second preset threshold is configured by the UE itself, or it is appointed in advance through the standard, or it is configured by the ANDSF;

the third preset threshold is configured by the UE itself, or it is appointed in advance through the standard, or it is configured by the ANDSF, or it is a threshold corresponding to an intra-system measurement event A2 of the same LTE system, or it is a threshold corresponding to an intra-system measurement event 1F or 2D of the same UMTS system;

the fourth preset threshold is configured by the UE itself, or it is appointed in advance through the standard, or it is configured by the ANDSF.

2. Corresponding to the scheme 2 in the background of the related art, the configuration scheme is described as follows:

the first preset time, the second preset time, the third preset time, the fourth preset time and the fifth preset time are configured by the 3GPP access network side and sent to the UE, or they are appointed in advance through the standard, and a timer is set at the UE side to time with regard to the first preset time, the second preset time, the third preset time, the fourth preset time and the fifth preset time respectively;

the first preset threshold is configured by the 3GPP access network side and sent to the UE, or it is appointed in advance through the standard, and the 3GPP access network notifies the UE of the load condition of the 3GPP access network itself by means of broadcasting or paging or dedicated signaling, or, the first preset threshold and the second preset time are configured by the 3GPP access network side, and when the load of the 3GPP access network exceeds the first preset threshold or the length of a time during which the load of the 3GPP access network continually exceeds the first preset threshold reaches the second preset time, the 3GPP access network notifies the UE of the occurrence of the event by means of broadcasting or paging or dedicated signaling;

the second preset threshold is configured by the 3GPP access network side and sent to the UE, or it is appointed in advance through the standard;

the third preset threshold is configured by the 3GPP access network side and sent to the UE, or it is appointed in advance through the standard, or it is a threshold corresponding to an intra-system measurement event A2 of the same LTE system, or it is a threshold corresponding to an intra-system measurement event 1F or 2D of the same UMTS system;

the fourth preset threshold is configured by the 3GPP access network side and sent to the UE, or it is appointed in advance through the standard.

3. Corresponding to the scheme 3 in the background of the related art, the configuration scheme is described as follows:

the first preset time is configured by the 3GPP access network side and sent to the UE, or it is appointed in advance through the standard.

The first preset threshold and the second preset time are configured by the 3GPP access network side, or they are appointed in advance through the standard;

the second preset threshold and the third preset time are configured by the 3GPP access network side and sent to the UE, or they are appointed in advance through the standard;

the third preset threshold and the fourth preset time are configured by the 3GPP access network side and sent to the UE, or they are appointed in advance through the standard, or they are thresholds corresponding to an intra-system measurement event A2 of the LTE system, or they are thresholds corresponding to an intra-system measurement event 1F or 2D of the UMTS system;

the fourth preset threshold and the fifth preset time are configured by the 3GPP access network side and sent to the UE, or they are appointed in advance through the standard.

The rule making entity for interworking between the 3GPP access network and the WLAN or the decision-making entity for interworking between the 3GPP access network and the WLAN configures parameters in the interworking process, and the parameters include: the first preset time, the second preset time, the third preset time, the fourth preset time, the fifth preset time, the first preset threshold, the second preset threshold, the third preset threshold and the fourth preset threshold.

When the rule making entity for interworking between the 3GPP access network and the WLAN or the decision-making entity for interworking between the 3GPP access network and the WLAN is located in the 3GPP access network, the 3GPP access network sends the parameters to the UE.

The embodiment 5 of the present document will be described in combination with the accompanying drawing below.

Figure 5:
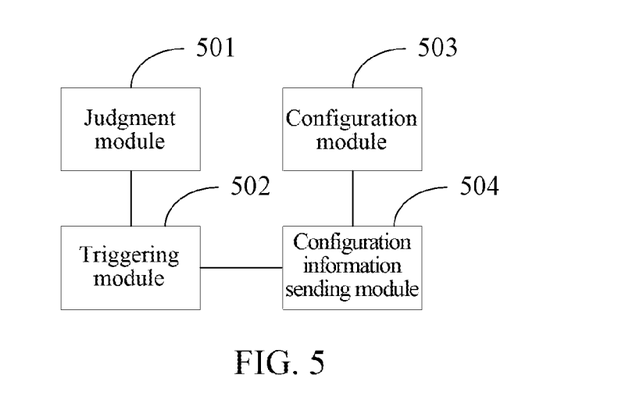
FIG. 5 is a schematic diagram of a structure of a device for interworking between access technology networks provided in the embodiment 5 of the present document.

The embodiment of the present document provides a device for interworking between access technology networks, and a structure of the device is as shown in FIG. 5, which includes:

a judgment module 501, configured to: judge whether to adopt a terminal power saving priority principle;

a triggering module 502, configured to: trigger an interworking process between a first access technology network and a second access technology network only when any one or any number of the following events occur:

quality of service of a service currently running on the UE cannot be satisfied, a load of the first access technology network which the UE currently accesses exceeds a first preset threshold;

a load of the second access technology network which the UE currently accesses exceeds a second preset threshold;

the first access technology network which the UE currently accesses or the second access technology network which the UE currently accesses has an overload;

wireless communication link quality of the first access technology network which the UE currently accesses is lower than a third preset threshold;

wireless communication link quality of the second access technology network which the UE currently accesses is lower than a fourth preset threshold; and the UE losses a connection with the first access technology network which the UE currently accesses or the second access technology network which the UE currently accesses.

Figure 6:
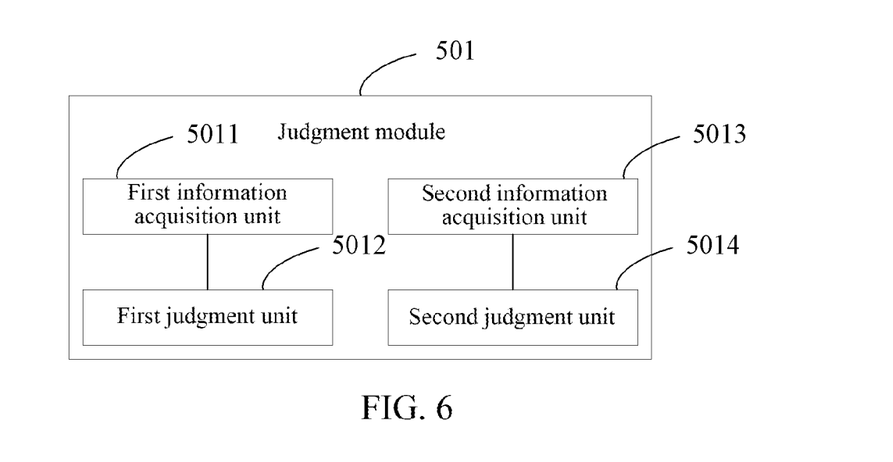
FIG. 6 is a schematic diagram of a structure of a judgment module 501 in FIG. 5.

Alternatively, a structure of the judgment module 501 is as shown in FIG. 6, which includes:

a first information acquisition unit 5011, configured to: when the UE triggers a power preference indication (PPI) and the PPI is inclined to power saving, acquire the PPI; and a first judgment unit 5012, configured to: determine that it is required to adopt the terminal power saving priority principle according to the PPI.

Alternatively, the judgment module 501 also includes:

a second information acquisition unit 5013, configured to: when the UE has a power saving priority attribute, acquire the power saving priority attribute of the UE; and a second judgment unit 5014, configured to: determine that it is required to adopt the terminal power saving priority principle according to the power saving priority attribute of the UE.

Alternatively, the device also includes:

a configuration module 503, configured to: configure parameters in the interworking process, wherein the parameters include: a first preset time, a second preset time, a third preset time, a fourth preset time, a fifth preset time, a first preset threshold, a second preset threshold, a third preset threshold and a fourth preset threshold.

Alternatively, the device also includes:

a configuration information sending module 504, configured to: send the parameters in the interworking process to the UE.

The first access technology network is the 3GPP access network, and the second access technology network is the WLAN. The above device for interworking between the access technology networks can be integrated in the 3GPP access network or the UE, to complete the corresponding functions.

The embodiments of the present document provide a method and device for interworking between access technology networks, a decision-making entity for interworking between the 3GPP access network and the WLAN judges whether it is required to adopt a terminal power saving priority principle, and when determining to adopt the terminal power saving priority principle, a triggering entity for interworking between the 3GPP access network and the WLAN triggers an interworking process between the 3GPP access network and the WLAN only when a preset triggering event occurs. The control on the power consumption of the UE in the interworking process between the 3GPP access network and the WLAN is implemented, which solves the power consumption control problem of the UE during the interworking between the 3GPP access network and the WLAN.

The ordinary person skilled in the art can understand that all or part of steps of the above embodiments can be implemented by using a flow of computer program, and the computer program can be stored in a computer readable memory medium, and the computer program is executed on corresponding hardware platforms (such as a system, equipment, device and component and so on), and when the program is carried out, one of the steps or a combination of the steps of the method embodiments is comprised.

Alternatively, all or part of the steps of the above embodiments also can be implemented by using integrated circuits, these steps can be made into a plurality of integrated circuit modules respectively or a plurality of modules or steps of them can be made into a single integrated circuit module to be implemented. Therefore, the present document is not limited to any combination of hardware and software in a specific form.

The devices or function modules or function units in the above embodiments can be implemented through a universal calculating device, and they can be concentrated on a single calculating device or distributed in a network consisting of a plurality of calculating devices.

If implemented in a form of software function module and sold or used as an independent product, the devices or function modules or function units in the above embodiments can be stored in a computer readable memory medium. The computer readable memory medium mentioned above can be a read-only memory, disk or optical disk and so on.

Any skilled familiar to the art can easily conceive changes or substitutions within the technical scope disclosed by the present document, and these changes and substitutions shall all be covered within the protection scope of the present document. Therefore, the protection scope of the present document should be subject to the protection scope described in the claims.

INDUSTRIAL APPLICABILITY

The embodiments of the present document can be used for controlling the power consumption of the UE in the interworking process between the 3GPP access network and the WLAN, which solves the power consumption control problem of the UE during the interworking between the 3GPP access network and the WLAN.

What is claimed is:

1. A method for interworking between access technology networks, comprising:

a decision-making entity for interworking between a first access technology network and a second access technology network judging whether to adopt a terminal power saving priority principle; and when the terminal power saving priority principle is adopted, triggering an interworking process between the first access technology network and the second access technology network only when any one or any number of the following events occur:

quality of service (QoS) of a service currently running on a user equipment (UE) cannot be satisfied;

a load of the first access technology network which the UE currently accesses exceeds a first preset threshold;

a load of the second access technology network which the UE currently accesses exceeds a second preset threshold;

the first access technology network which the UE currently accesses or the second access technology network which the UE currently accesses overloads;

wireless communication link quality of the first access technology network which the UE currently accesses is lower than a third preset threshold;

wireless communication link quality of the second access technology network which the UE currently accesses is lower than a fourth preset threshold; and the UE losses a connection with the first access technology network which the UE currently accesses or the second access technology network which the UE currently accesses.

2. The method for interworking between access technology networks according to claim 1, wherein, the first access technology network is a 3rd generation partnership project (3GPP) access network, and the second access technology network is a wireless local area network (WLAN).

3. The method for interworking between access technology networks according to claim 1, wherein, the quality of service (QoS) of a service currently running on the UE can not be satisfied comprises:
a length of a time during which the QoS of the service currently running on the UE can not be satisfied continuously exceeding a first preset time.

4. The method for interworking between access technology networks according to claim 1, wherein, a load of the first access technology network which the UE currently accesses exceeding a first preset threshold comprises:
a length of a time during which the load of the first access technology network which the UE currently accesses continuously exceeds the first preset threshold reaching a second preset time.

5. The method for interworking between access technology networks according to claim 1, wherein, a load of a second access technology network which the UE currently accesses exceeding a second preset threshold comprises:
a length of a time during which the load of the second access technology network which the UE currently accesses continuously exceeds the second preset threshold reaching a third preset time,
or,
wherein, wireless communication link quality of the first access technology network which the UE currently accesses being lower than a third preset threshold comprises:
a length of a time during which the wireless communication link quality of the first access technology network which the UE currently accesses is continuously lower than the third preset threshold reaching a fourth preset time,
or,
wherein, wireless communication link quality of the second access technology network which the UE currently accesses being lower than a fourth preset threshold comprises:
a length of a time during which the wireless communication link quality of the second access technology network which the UE currently accesses is continuously lower than the fourth preset threshold reaching a fifth preset time.

6. The method for interworking between access technology networks according to claim 1, wherein, a decision-making entity for interworking between a first access technology network and a second access technology network judging whether to adopt a terminal power saving priority principle comprises:
when the UE has a power saving priority attribute, the decision-making entity for interworking between the first access technology network and the second access technology network acquiring the power saving priority attribute of the UE; and
the decision-making entity for interworking between the first access technology network and the second access technology network determining that it is required to adopt the terminal power saving priority principle according to the power saving priority attribute of the UE.

7. The method for interworking between access technology networks according to claim 6, wherein, the decision-making entity for interworking between the first access technology network and the second access technology network acquiring the power saving priority attribute of the UE comprises:
when the decision-making entity for interworking between the first access technology network and the second access technology network is located in the first access technology network node, the UE sending the power saving priority attribute to the decision-making entity for interworking between the first access technology network and the second access technology network in the first access technology network node.

8. The method for interworking between access technology networks according to claim 7, wherein, the power saving priority attribute is contained in registration information of the UE or a context of the UE, and the decision-making entity for interworking between the first access technology network and the second access technology network acquires the power saving priority attribute through a connection process between the UE and the first access technology network.

9. The method for interworking between access technology networks according to claim 6, wherein, the decision-making entity for interworking between the first access technology network and the second access technology network acquiring the power saving priority attribute of the UE comprises:
when the decision-making entity for interworking between the first access technology network and the second access technology network is located in the UE, the UE voluntarily sending the power saving priority attribute to the decision-making entity for interworking between the first access technology network and the second access technology network in the UE.

10. The method for interworking between access technology networks according to claim 1, further comprising:
a rule making entity for interworking between the first access technology network and the second access technology network or the decision-making entity for interworking between the first access technology network and the second access technology network configuring parameters in the interworking process, wherein the parameters comprise: the first preset time, the second preset time, the third preset time, the fourth preset time, the fifth preset time, the first preset threshold, the second preset threshold, the third preset threshold and the fourth preset threshold.

11. The method for interworking between access technology networks according to claim 10, further comprising:
when the rule making entity for interworking between the first access technology network and the second access technology network or the decision-making entity for interworking between the first access technology network and the second access technology network is located in the first access technology network, the first access technology network sending the parameters to the UE.

12. The method for interworking between access technology networks according to claim 1, wherein, a decision-making entity for interworking between a first access technology network and a second access technology network judging whether to adopt a terminal power saving priority principle comprises:

when the UE triggers a power preference indication (PPI) and the PPI is inclined to power saving, the decision-making entity for interworking between the first access technology network and the second access technology network acquiring the PPI; and the decision-making entity for interworking between the first access technology network and the second access technology network determining that it is required to adopt the terminal power saving priority principle according to the PPI.

13. The method for interworking between access technology networks according to claim 12, wherein, the decision-making entity for interworking between the first access technology network and the second access technology network acquiring the PPI comprises:

when the decision-making entity for interworking between the first access technology network and the second access technology network is located in a first access technology network node, the UE sending the PPI to the decision-making entity for interworking between the first access technology network and the second access technology network in the first access technology network node.

14. The method for interworking between access technology networks according to claim 12, wherein, the decision-making entity for interworking between the first access technology network and the second access technology network acquiring the PPI comprises:

when the decision-making entity for interworking between the first access technology network and the second access technology network is located in the UE, the UE voluntarily sending the PPI to the decision-making entity for interworking between the first access technology network and the second access technology network in the UE.

15. A device for interworking between access technology networks, comprising hardware performing instructions stored in a non-transitory computer readable medium which executes steps in following modules:

a judgment module, configured to: judge whether to adopt a terminal power saving priority principle;

a triggering module, configured to: when the terminal power saving priority principle is adopted, trigger an interworking process between a first access technology network and a second access technology network only when any one or any number of the following events occur:

quality of service (QoS) of a service currently running on a user equipment (UE) cannot be satisfied;

a load of the first access technology network which the UE currently accesses exceeds a first preset threshold;

a load of the second access technology network which the UE currently accesses exceeds a second preset threshold;

the first access technology network which the UE currently accesses or the second access technology network which the UE currently accesses overloads;

wireless communication link quality of the first access technology network which the UE currently accesses is lower than a third preset threshold;

wireless communication link quality of the second access technology network which the UE currently accesses is lower than a fourth preset threshold; and the UE losses a connection with the first access technology network which the UE currently accesses or the second access technology network which the UE currently accesses.

16. The device for interworking between access technology networks according to claim 15, wherein, the first access technology network is a 3rd generation partnership project (3GPP) access network, and the second access technology network is a wireless local area network (WLAN).

17. The device for interworking between access technology networks according to claim 15, wherein, the judgment module comprises:

a first information acquisition unit, configured to: when the UE triggers a power preference indication (PPI) and the PPI is inclined to power saving, acquire the PPI; and a first judgment unit, configured to: determine that it is required to adopt the terminal power saving priority principle according to the PPI.

18. The device for interworking between access technology networks according to claim 17, wherein, the judgment module further comprises:

a second information acquisition unit, configured to: when the UE has a power saving priority attribute, acquire the power saving priority attribute of the UE; and a second judgment unit, configured to: determine that it is required to adopt the terminal power saving priority principle according to the power saving priority attribute of the UE.

19. The device for interworking between access technology networks according to claim 18, wherein the hardware, when performing the instructions stored in the non-transitory computer readable medium, further executes steps in a following module:

a configuration module, configured to: configure parameters in the interworking process, wherein the parameters comprise: a first preset time, a second preset time, a third preset time, a fourth preset time, a fifth preset time, a first preset threshold, a second preset threshold, a third preset threshold and a fourth preset threshold.

20. The device for interworking between access technology networks according to claim 19, wherein the hardware, when performing the instructions stored in the non-transitory computer readable medium, further executes steps in a following module:

a configuration information sending module, configured to: send the parameters in the interworking process to the UE.

* * * * *